United States Patent [19]

Wantanabe et al.

[11] Patent Number: 5,369,505
[45] Date of Patent: Nov. 29, 1994

[54] IMAGE PROCESSING APPARATUS

[75] Inventors: Asao Wantanabe, Higashikurume; Yukihiko Ogata, Kawasaki; Hiroyuki Nakanishi, Yokohama; Seijiro Yanase, Machida; Koji Harada, Fuchu, all of Japan

[73] Assignee: Canon Kabushiki Kaisha, Tokyo, Japan

[21] Appl. No.: 807,180

[22] Filed: Dec. 16, 1991

[30] Foreign Application Priority Data

Dec. 20, 1990 [JP]  Japan .................................. 2-404037

[51] Int. Cl.$^5$ .............................................. H04N 1/40
[52] U.S. Cl. ..................................... 358/444; 358/404; 358/448; 358/403; 358/426; 358/261.1; 358/261.4
[58] Field of Search ............... 358/444, 440, 404, 401, 358/403, 448, 426, 427, 261.4, 261.1, 261.2, 261.3, 427, 262.1, 428-433

[56] References Cited

U.S. PATENT DOCUMENTS

| | | | |
|---|---|---|---|
| 4,668,960 | 5/1987 | Okamura | 346/24 |
| 4,677,649 | 6/1987 | Kunishi et al. | 375/122 |
| 4,717,967 | 1/1988 | Yoshida | 358/296 |
| 4,772,955 | 9/1988 | Kurahayashi et al. | 358/426 |
| 4,796,092 | 1/1989 | Ogata | 358/261.1 |
| 4,814,890 | 3/1989 | Kato | 358/443 |
| 4,845,569 | 7/1989 | Kurahayashi et al. | 358/400 |
| 5,016,114 | 5/1991 | Sakata et al. | 358/401 |
| 5,033,106 | 7/1991 | Kita | 382/56 |
| 5,165,071 | 11/1992 | Moriya et al. | 1/401 |

FOREIGN PATENT DOCUMENTS

| | | | |
|---|---|---|---|
| 3736220 | 5/1988 | Germany . | |
| 0101563 | 6/1983 | Japan | 358/444 |
| 2172464 | 9/1986 | United Kingdom . | |

OTHER PUBLICATIONS

Patent Abstracts of Japan, vol. 14, No. 538 (Nov. 28, 1990) (Kokai 2-228769).
Patent Abstracts of Japan, vol. 10, No. 57 (Mar. 7, 1986) (Kokai 60-201479).
Patent Abstracts of Japan, vol. 13, No. 226, (May 25, 1989) (Kokai 1-34067).
Patent Abstracts of Japan, vol. 22, No. 249 (Aug. 13, 1987) (Kokai 62-60361).

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image processing apparatus in which image data is input page by page. Non-coded image data and coded image data are generated from the input image data and are stored in an image memory. A controller controls storage of the data into the image memory, and selects which one of the non-coded image data and the coded image data are saved in the image memory based on the size of the coded image data.

21 Claims, 6 Drawing Sheets

IMAGE PROCESSING APPARATUS

BACKGROUND OF THE INVENTION

1. Field of the Invention

The present invention relates to an image processing apparatus, and more particularly to an image processing apparatus which stores input image data into a memory to effect image processing.

2. Related Background Art

In a prior art image processing apparatus such as a facsimile apparatus, a system for storing image data into a memory before it is transmitted or outputted for recording has been known.

Compression of the image data to shorten an image transmission/reception time has also been known.

Data compression is useful to reduce memory capacity for storing the image data. Methods of storing the image data include, storing uncompressed raw data or storing the image data in a compressed form by a coding system such as an MH (modified Huffman) code or an MR (modified READ) code.

United State Patent (USP) relating to a facsimile apparatus which stores image data into a memory include U.S. Pat. Nos. 4,717,967, 4,796,092, 4,677,649, 4,814,890, 4,772,955 and 4,845,569.

When the image data is stored in prior art image processing apparatus, it is common to store the image data as raw image data or compressed data such as MH code or MR code. However, prior art methods have the following disadvantages.

(1) Storing by the raw image data only

Since the data volume for one sheet (one page) of the binarized image is constant whether the compression factor is high or low, an assured number of pages to be stored can be determined from the memory capacity, and it is a maximum number of sheets (pages) to be stored.

Where the assured number of pages to be stored is to be increased, a considerable memory capacity is required and a cost significantly increases.

(2) Storing by compressed code data only such as MH code or MR code:

Since the MH or MR code for compression is determined based on a statistical nature of a most popular image such as a text document, the compression factor of the image data is low for a document image having a different statistical nature, and the volume after the compression may be several times as large as that of the raw image data. As a result, the assured number of pages to be stored cannot be determined, and the number of sheets to be stored depends on the document and is very unstable.

SUMMARY OF THE INVENTION

It is an object of the present invention to improve an image processing apparatus.

It is another object of the present invention to provide an image processing apparatus which can assure a predetermined number of pages to be stored and improve a use efficiency of an image memory.

It is a further object of the present invention to improve the use efficiency of the memory by storing coded data and raw image data when one page of image data is to be stored in the memory. That is, if the coded data is less than a predetermined volume, the coded data is selected, and if the coded data is larger than the predetermined volume, the raw image data is selected.

Other objects of the present invention will be apparent from the following detailed description of the embodiments and the accompanying drawings.

DETAILED DESCRIPTION OF THE PREFERRED EMBODIMENTS

One embodiment of the present invention is now explained in detail with reference to the drawings.

In the following embodiment, an information display apparatus with a communication function is described as an example of the image processing apparatus.

Figure 1:
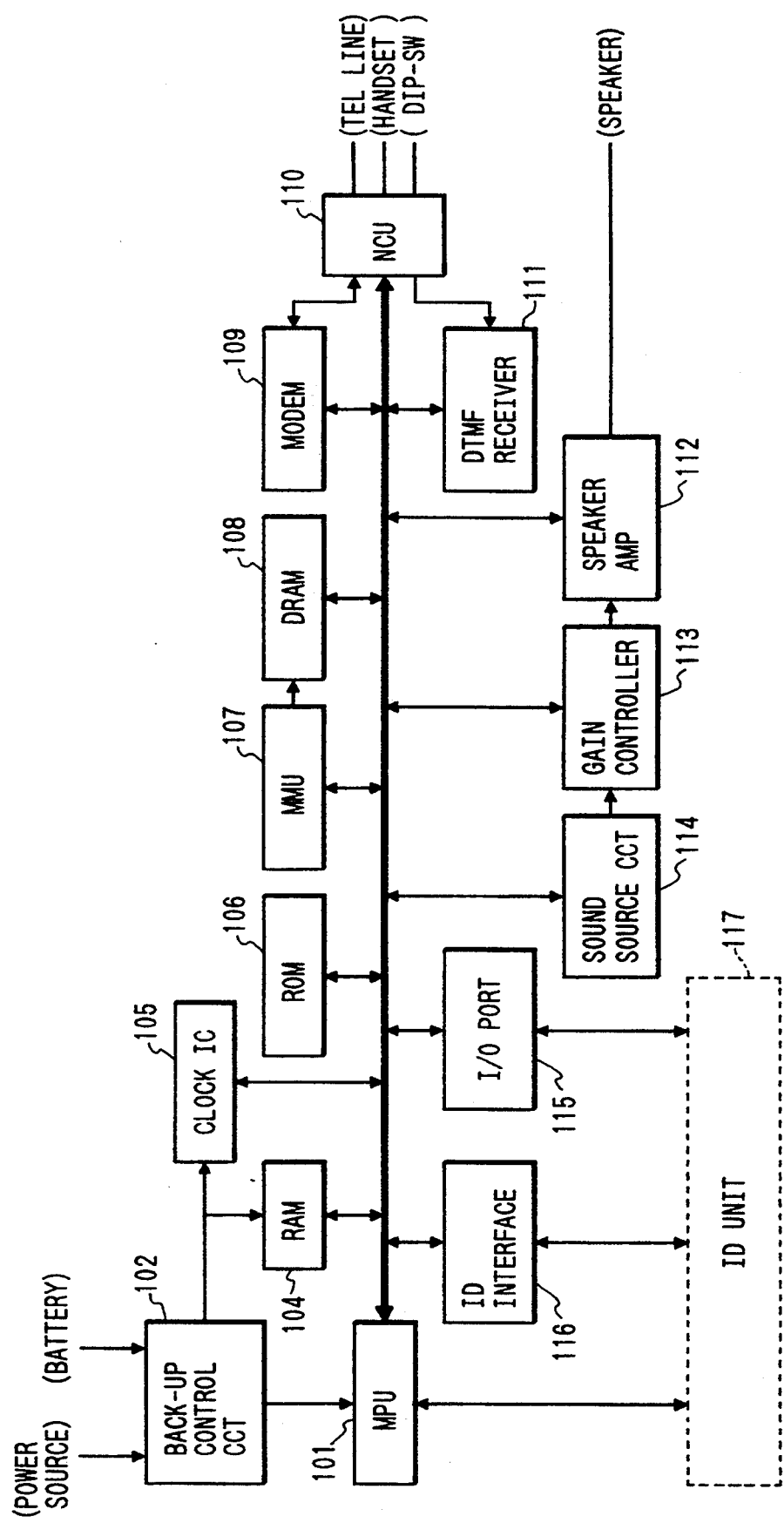
FIG. 1 is a block diagram of a configuration of an information display apparatus with a communication function in accordance with one embodiment of the invention.

FIG. 1 is a block diagram of a configuration of the information display apparatus of the present embodiment.

Numeral 101 denotes an MPU such as a microprocessor for controlling a communication function unit (facsimile communication unit). The following units are connected to a bus of the MPU 101.

Numeral 102 denotes a backup control circuit for switching a power supply voltage from a line voltage to a battery voltage when the former falls below a predetermined level to thereby back up a clock IC and a RAM, numeral 104 denotes the RAM, and numeral 105 denotes the clock IC for controlling timing in the image processing apparatus.

Numeral 106 denotes a known ROM which stores a control program of the MPU 101, and which is described later. Numeral 107 denotes a memory mapping unit (MMU) for managing the memory, and numeral 108 denotes a DRAM which stores image data.

Numeral 109 denotes a modem, numeral 110 denotes an NCU for switching a facsimile apparatus and a telephone set, and numeral 111 denotes a DTMF receiver for detecting a DTMF signal.

Numeral 112 denotes a speaker amplifier for generating sound in a speaker, numeral 113 denotes a gain controller for controlling a sound level, and numeral 114 denotes a voice source circuit including a voice synthesizer for generating a voice signal. A voice output circuit comprising the blocks 112 ∼ 114 is used to ring a pseudo bell and call an operator by a voice signal.

Numeral 115 denotes an I/O port for controlling turn-on of an LED, numeral 116 denotes an ID interface for sending image data to a main unit of the information display (ID) apparatus, and numeral 117 denotes the ID main unit for displaying a received image.

The ID main unit comprises a plate recording unit including a display unit of a magnestylus type. In the present embodiment, it is assumed that the present apparatus is used as the plate recording apparatus with a communication function to display information such as images, characters and graphics to many non-specified persons at a public place such as a station, airport or event place. When the ID main unit 117 is substituted by an image recording unit and an image reader is additionally provided, it constitutes a configuration of a conventional facsimile apparatus.

An operation of the above apparatus is now explained.

In the configuration of FIG. 1, coded image data (compressed data) from the telephone line is applied to the modem 109 through the NCU 110 and converted to a digital signal thereby, and it is stored in the DRAM 106 through the MMU 107.

When raw image data (non-compressed data) is transferred, it is also stored in the DRAM 108.

Where the ID main unit 117 of the apparatus is substituted for by an image recording unit and an image reader is additionally provided to constitute a conventional facsimile apparatus, the raw image data read by the image reader or the coded data is stored in the DRAM 108.

A method of storing data into the DRAM 108 will be described later in detail.

Where the apparatus is configured as information display apparatus with the communication function, the image data in the DRAM 108 is displayed on the ID main unit 117 through the ID interface 116.

Figure 2:
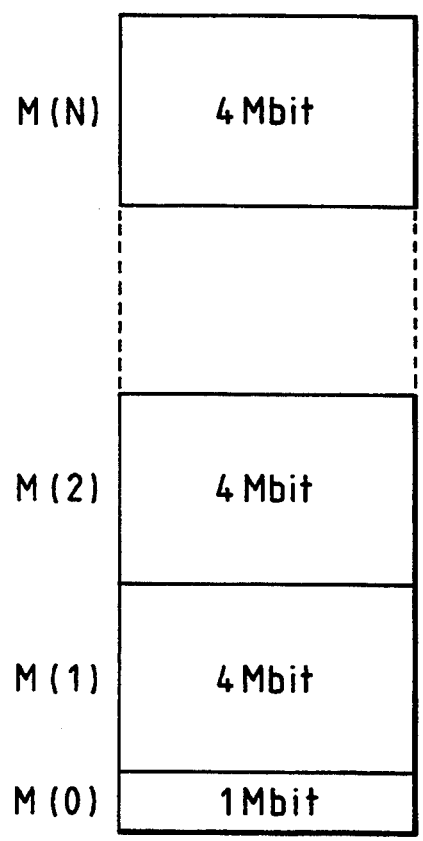
FIG. 2 is a configuration of an image memory in the one embodiment.

FIG. 2 illustrates a configuration of the DRAM 108 of FIG. 1.

In the present embodiment, the DRAM 108 can store at least N pages (sheets) of image data of a predetermined size. This assures a minimum number of pages to be stored in the DRAM 108.

Assuming that the image size is A4, the image for one A4 size page corresponds to approximately 4M bits of raw image data when an image density is 8 pels/mm.

In the present embodiment, since the assured number of pages of image to be stored in the DRAM 108 is N, the DRAM 108 comprises areas M(l) ~M(N) each having a 4M bits capacity and a code buffer M(O) having a 1M bits capacity to store at least one (or several) page of coded image data. Not only the raw image data but also the compressed code data are sometimes stored in the areas M(1) ~M(N) which have the 4M bits ×N capacity.

The address of the DRAM 108 (vertical line in FIG. 2 represents the memory address) is controlled such that the compressed code data is stored in the order of the areas M(O), M(1), M(2), ... while the raw image data is stored in the reverse order of M(N), M(N−1), ..., M(2), M(1).

Figure 3:
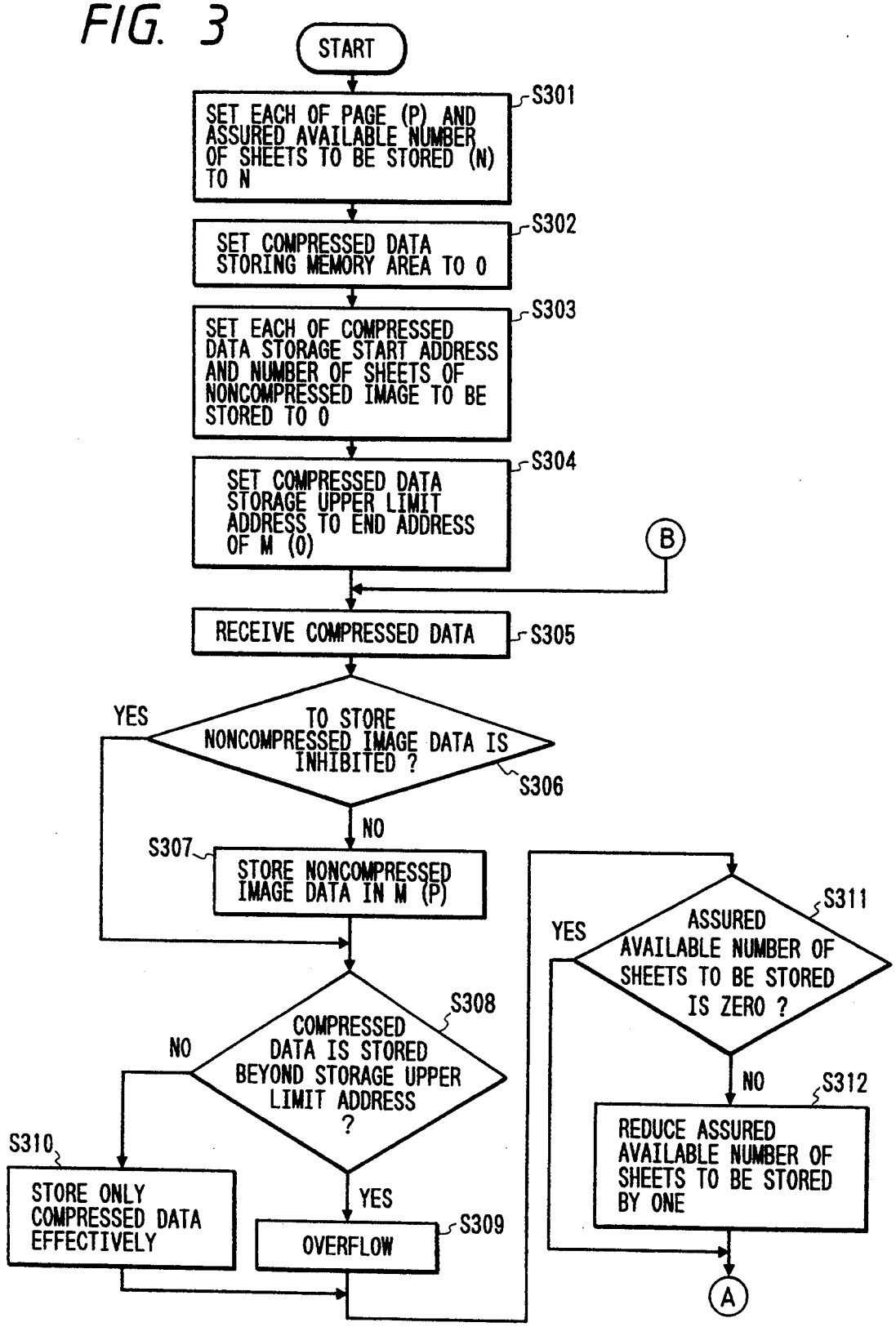
FIGS. 3 to 5 are flow charts of control operations of a MPU 101 of the one embodiment.
Figure 4:
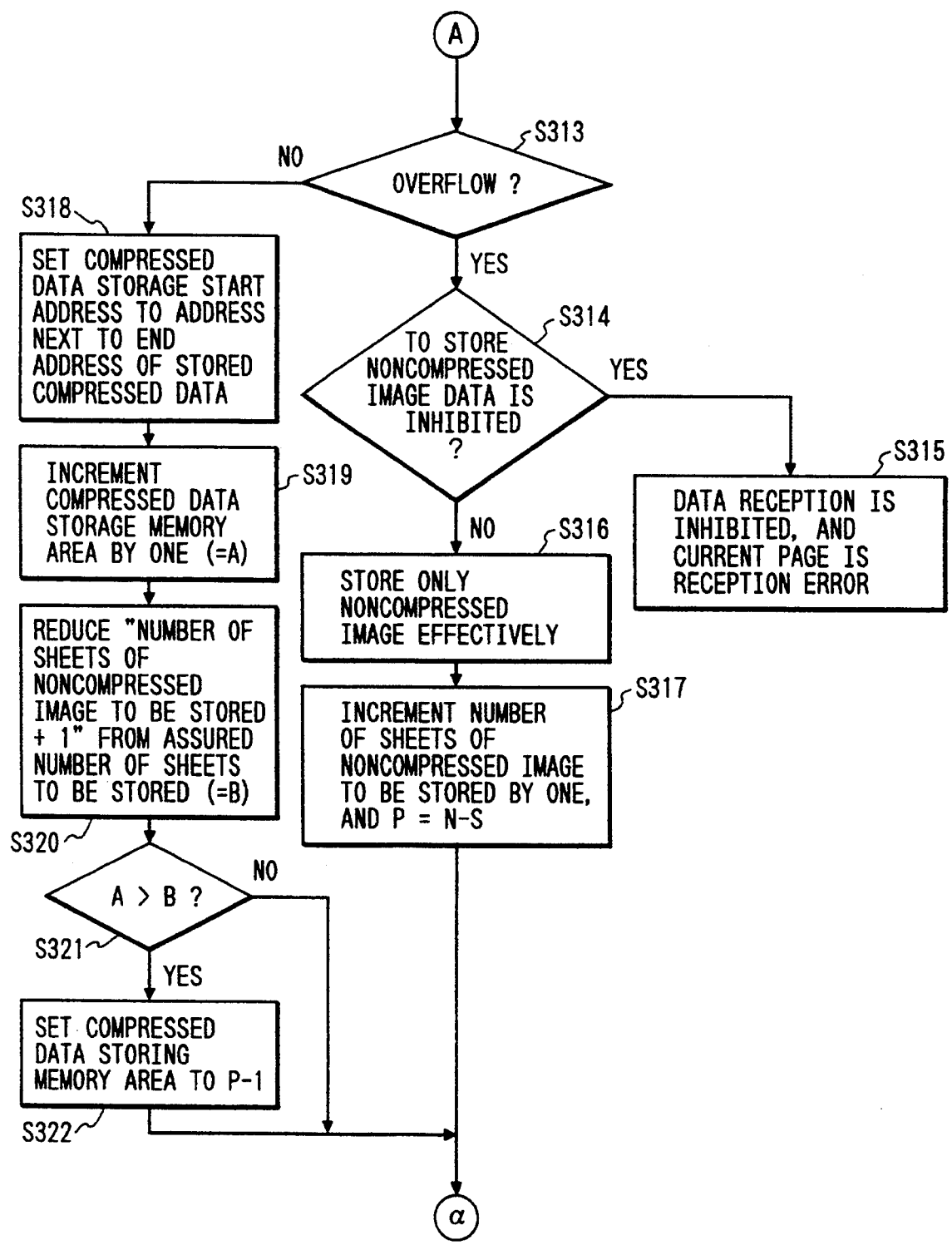
Figure 5:
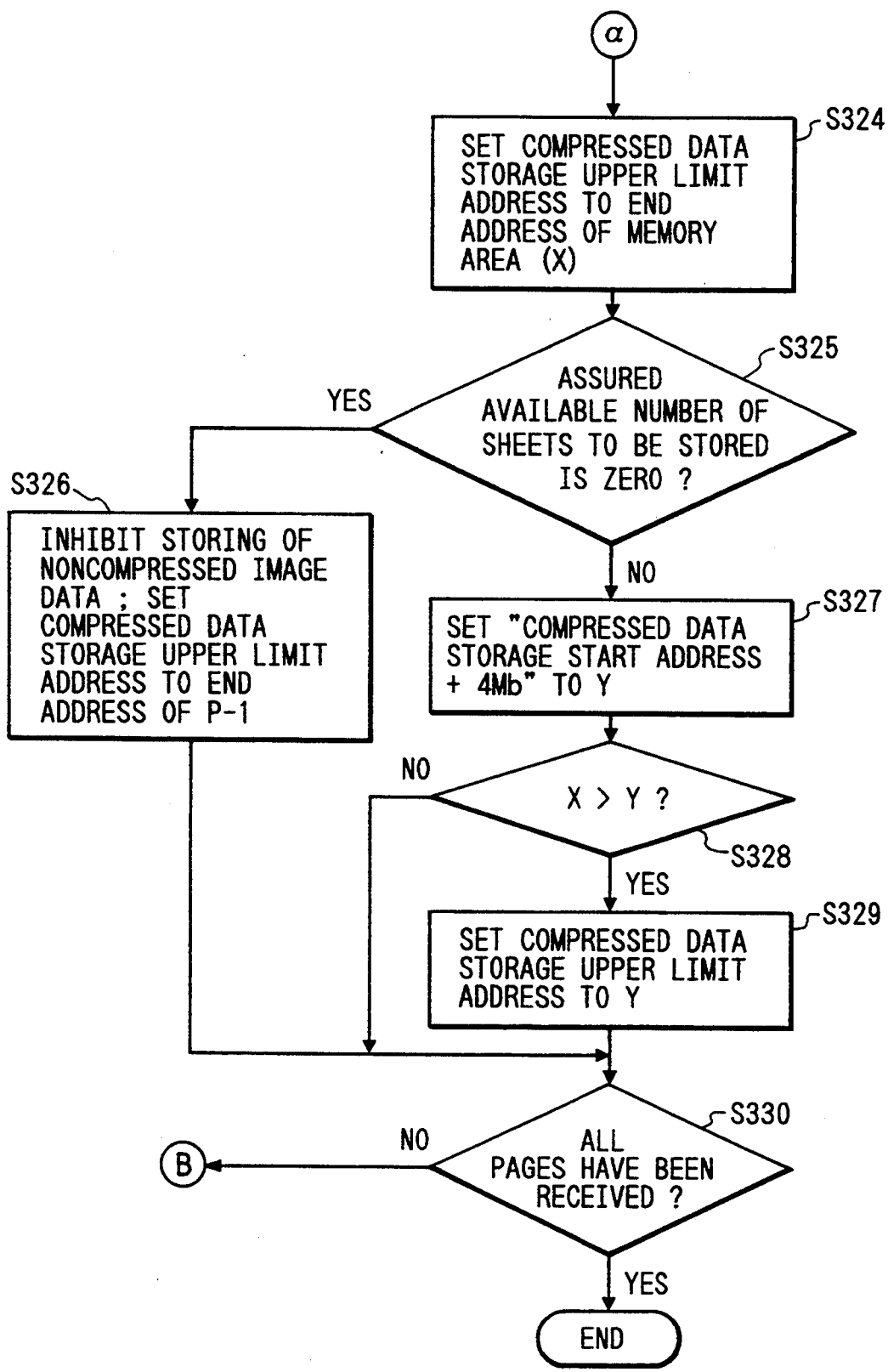

Referring to the flow charts of FIGS. 3 to 5, the memory control by the MPU 101 and the MMU 107 is specifically explained. FIGS. 3-5 are connected by the like alphabet or Greek letters.

It is assumed that the assured number of pages (sheets) to be stored in the DRAM 108 is 3. Accordingly, the DRAM 108 comprises three 4M bits areas (M(1), M(2), M(3) ) and one 1M bits compressed data buffer (M(0)). This need not mean that the DRAM 108 has such a capacity in hardware but those areas may be set by software memory management.

In such a case, the assured number of pages N to be stored may be variable and the memory may be dynamically configured so that other area may be assigned to other applications.

FIGS. 6(a)~6(d) show a transition of the status of the DRAM 108 when the compressed data on pages 2 and 3 overflow. The raw image data is shown by PIX(1), the compressed data is shown by COD(l), and the number in ( ) represents the received page. The content of ( ) may be considered as an array index where the area M(X) is an array and the DRAM 108 is an array of such arrays.

In the flow chart of FIG. 3, the page P and the assured available number of pages N are set to 3 (step S301), and the memory area 0 is selected to store the compressed data (the area M(0) is selected) (step S302). This means that the compressed data is to be stored in the area M(0) in FIG. 6.

A start address to store the compressed data and the number of pages S of raw image to be stored are set to 0 (step S303).

A pointer for an upper limit address to store the compressed data is set to an end address of the area M (0) (step S304). The pointer setting is shown by an arrow P in FIG. 6(a). Thus, the initialization is completed.

Then, the compressed data is stored in the area M(0) (step S305), and the raw image data is stored in the area M(3) (step S307) since the storing thereof is not inhibited (step S306). This status is shown in FIG. 6(a). Since the compressed data of page 1 does not exceed the upper limit address of the storing (step S308), only the compressed data is treated as valid (step S310). This means that only the compressed data is saved and the raw image data is treated as invalid and the raw image data of the next page will be overwritten in the area in which the raw image data of the first page has been stored. The assured available number of pages is now set to 3−1=2 (steps S311 and S312).

In a step S313 (FIG. 4), a decision is relative to overflow determined to be NO because the compressed data does not overflow, and the start address to store the compressed data is set to the next address to the end address of the COD(l) (step S318), and the memory area to store the compressed data is changed from 0 to 1 (from the area M(0) to the area M(1) ) (step S319). A value 1 which represents an index change is designated by A.

The assured number of pages 3 to be stored less ((the number of pages of the stored raw images) +1) is 3−1=2 because the number of pages of the stored raw image is zero since the raw image data of page 1 is invalidated (step S320). This index is designated by B.

When A and B are compared (step S321), A>B is not met and the process proceeds to a step S324 (FIG. 5). The steps S318 ~S322 assure the work area to develop the stored compressed data to the raw image. It requires one page size of the raw image data, namely, 4M bits.

In step S324, the upper address to store the compressed data is set to the end address of the area M(1). This address is designated by X.

In step S325, a decision is NO because the assured available number of pages to be stored is 2. (The start address-to store the compressed data) +4 bits is designated by Y (step S327). Since X >Y (step S328), the upper limit address to store the compressed data is set to Y (step S329).

Figure 6:
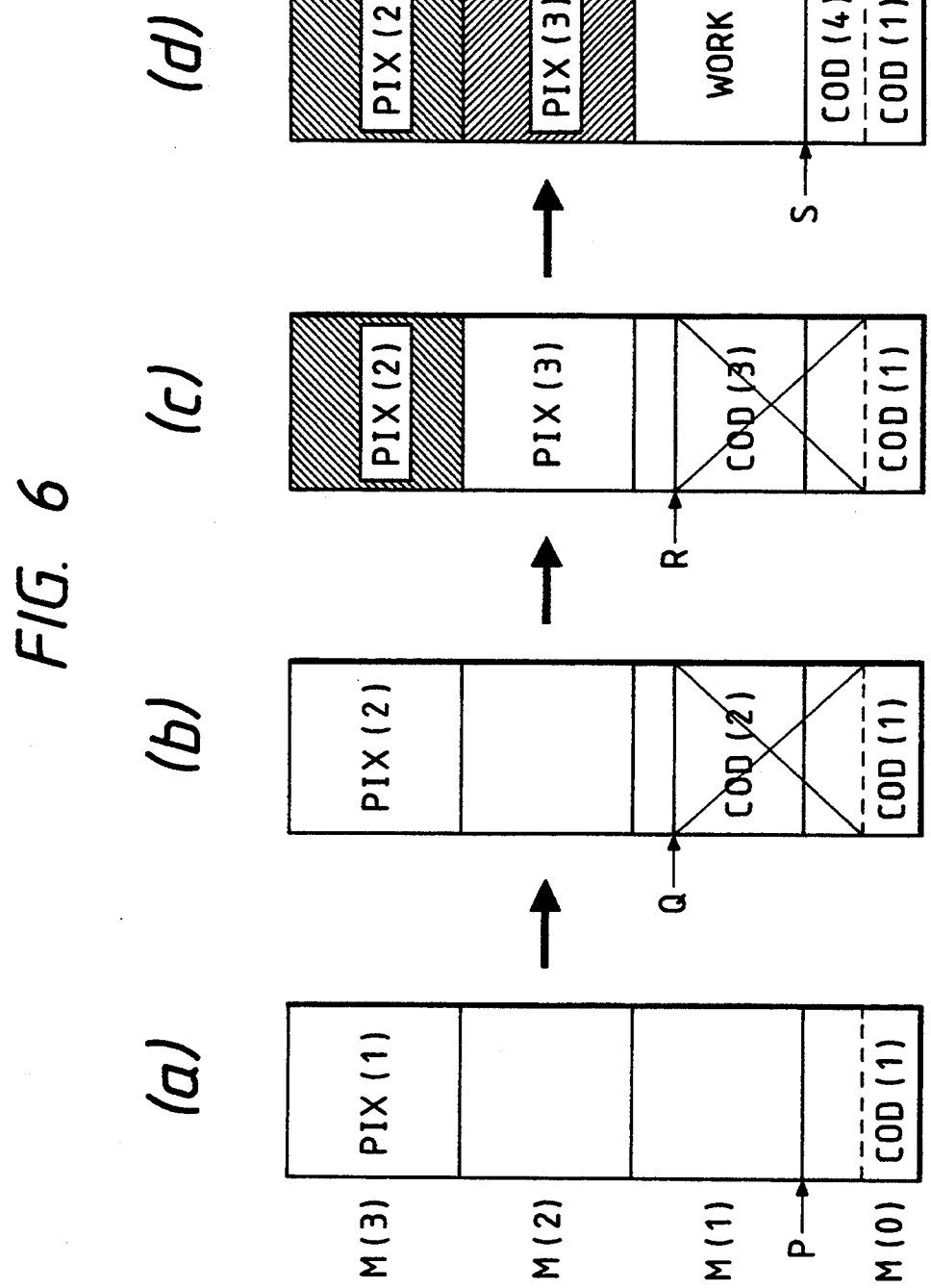
FIG. 6 illustrates a load operation to the image memory.

This position is shown by an arrow Q in FIG. 6. A decision in step S330 is NO and the process returns to step S305 to receive the second page.

For the second page, the compressed data is received (step S305) and the raw image data is stored in the area M(3) because the storing thereof is not inhibited (steps S306 and S307).

The compressed data overflows (steps S308 and S309), and the assured available number of pages is set to 2−1=1 (steps S311 and S312). FIG. 6(b) illustrates this status.

The decision in step S313 is YES because of overflow, and a decision in the step S314 is NO because the storing of the raw image is not inhibited, and only the raw image data is treated as valid (step S316). This means that only raw image data is saved and the compressed data is invalidated and the compressed data of the next page will be overwritten on the same area.

The number of pages S of the stored raw image changes from 0 to 1 and P changes to 3−1=2 (step S317). The upper limit address to store the compressed data is the same as that for the second page because the assured available number of pages is not zero (steps S324, S325, S327, S328 and S329).

For the third page, the compressed data is stored (step S305) and the raw image data is stored in the area M(2) (step S307). The compressed data overflows (steps S308 and S309). This status is shown in FIG. 6(c).

The assured available number of pages is set to 1−1=0 (steps S311 and S312). Since the compressed data overflows and the storing of the raw image is not inhibited (steps S313 and S314), only the raw image data is treated as valid (step S316) and the number of pages S of the stored raw image is set to 2, and P is set to 1 (step S317).

The decision in a step S325 is YES because the assured available number of pages is 0. The storing of the raw image data is inhibited and the upper limit address to store the compressed data is set to the end address of the area M(0) (step S326). The process returns to step S305 to receive the fourth page.

For the fourth page, only the compressed data is stored (step S305) and the raw image data is not stored because it is inhibited (step S306). The compressed data is treated as valid because it does not overflow (steps S308 and S310) and the process is terminated because all pages have been received (step S330).

In this manner, the image data for the assured number of pages can be stored without overflow by the small capacity memory configuration which comprises the memory areas (M (1)∼M (3) ) which correspond in number to the assured number of pages to be stored and each of which has a capacity to store the raw data, and the memory area (M(0)) having the capacity to store at least one (or several) page of coded image data. While the assured number of pages N to be stored is set to 3 in the present embodiment, the number is not restrictive.

Whether the compressed data is stored in the memory or the raw data is stored in the memory is determined by the volume of the compressed data. Accordingly, memory overflow is positively avoided and the assured number of pages N to be stored is always assured.

Further, since the storing of the compressed data is tried where possible, the assured number of pages N to be stored is assured while the memory use efficiency is improved as much as possible.

The assured number of pages to be stored is alway assured, however the compression factor of the image is low. If the compression factor is high, many pages of image can be stored.

Since only the area to store the coded code is provided in the code buffer in addition to the raw data memory areas for the minimum assured number of pages, the memory capacity does not significantly increase compared to the prior art system in which only the raw data memory areas are provided. Accordingly, the hardware is attained with a low cost. Because the compressed data is stored, the memory efficiency is significantly improved compared to the prior art system in which only the raw data memory areas are provided.

Where the apparatus is configured as the plate recording apparatus with the communication function, it may be installed at a public place such as a station, airport or event place, and the apparatus may be remotely controlled through communication control.

In such a case, it is necessary to transfer the image data to the apparatus from a remote place and store it into the DRAM 108. In accordance with the present configuration, the image data can be stored without overflow and the error-free automated operation is assured.

In the present embodiment, the received image data is stored in the DRAM 108. Similar control may be applied to a facsimile apparatus when the image read by the read means is to be stored. The above memory control is not limited to image communication apparatus but it is equally applicable to various image processing apparatus which temporarily store the input image for subsequent processing.

While the dynamic memory area control of the DRAM 108 is discussed in the present embodiment, the present invention is equally applicable when the areas M(1)∼M(N) which correspond in number to the minimum assured number of pages N to be stored are provided by hardware.

The present invention is not limited to the illustrated embodiments but various modifications may be made.

What is claimed is:

1. In image processing apparatus comprising:
   means for inputting image data page by page;
   means for generating non-coded image data of the image data input by said input means and coded image data of the same image data;
   image memory means for storing the non-coded image data and the coded image data; and
   control means for providing control such that the non-coded image data generated by said generating means is stored in a first area of said image memory means, and the coded image data is stored in a Second area of said image memory means, and one of the non-coded image data stored in the first area and the coded image data stored in the second area is invalidated in accordance with a data amount of the coded image data stored in the second area.

2. An image processing apparatus according to claim 1, wherein said control means provides control such that when the data amount of the coded image data stored in the second area exceeds a predetermined amount, the coded image data stored in the second area is invalidated, and when the data amount of the coded image data stored in the second area is less than the predetermined amount, the non-coded image data stored in the first area is invalidated.

3. An image processing apparatus according to claim 1, wherein said input means inputs the coded image data, and said generation means decodes the input coded image data to generate the non-coded image data.

4. An image processing apparatus according to claim 1, wherein said input means inputs the non-coded image data, and said generation means encodes the input non-coded image data to generate coded image data.

5. An image processing apparatus according to claim 1, wherein said control means provides control such that the non-coded image data is stored starting from a first address of said image memory means toward a second address thereof, and the coded image data is stored starting from the second address of said image memory means toward the first address thereof.

6. An apparatus according to claim 1, wherein said image memory means is provided with a storage capacity capable of storing a plurality of pages of non-coded image data.

7. An apparatus according to claim 1, wherein said control means provides control such that when the non-coded image data stored in the first area is invalidated, non-coded image data involved in a successive page of image data is overwritten onto the storage area in which the invalidated non-coded image data had been stored.

8. An apparatus according to claim 1, wherein said control means provides control such that when the coded image data stored in the second area is invalidated, coded image data involved in a successive page of image data is overwritten onto the storage area in which the invalidated coded image data had been stored.

9. An apparatus according to claim 1, further comprising display means for displaying image data read out from the image memory means.

10. An image processing apparatus comprising:
means for inputting coded image data;
means for decoding the coded image data input by said input means to generate non-coded image data;
image memory means for storing the coded image data and the non-coded image data; and
control means for providing control such that the non-coded image data generated by said decoding means is stored in a first area of said image memory means, and the coded image data is stored in a second area of said image memory means, and one of the non-coded image data stored in the first area and the coded image data stored in the second area is invalidated in accordance with a data amount of the coded image data stored in the second area.

11. In image processing apparatus according to claim 10, wherein said control means provides control such that when the data amount of the coded image data stored in the second area exceeds a predetermined amount, the coded image data stored in the second area is invalidated, and when the data amount of the coded image data stored in the second area is less than the predetermined amount, the non-coded image data stored in the first area is invalidated.

12. An apparatus according to claim 10, wherein said image memory means is provided with a storage capacity capable of storing a plurality of pages of non-coded image data.

13. An apparatus according to claim 10, wherein said control means provides control such that when the non-coded image data stored in the first area is invalidated, non-coded image data involved in a successive page of image data is overwritten onto the storage area in which the invalidated non-coded image data had been stored.

14. An apparatus according to claim 10, wherein said control means provides control such that when the coded image data stored in the second area is invalidated, coded image data involved in a successive page of image data is overwritten onto the storage area in which the invalidated coded image data had been stored.

15. An apparatus according to claim 10, wherein said control means provides control such that the non-coded image data is stored starting from a first address of said image memory means toward a second address thereof, and the coded image data is stored starting from the second address of said image memory means toward the first address thereof.

16. An apparatus according to claim 10, further comprising display means for displaying image data read out from the image memory means.

17. A method of storing image data comprising the steps of:
(a) inputting image data page by page;
(b) generating coded image data and non-coded image data of the input image data;
(c) storing the non-coded image data in a first area of an image memory means, and storing the coded image data in a second area of the image memory means; and
(d) invalidating one of the non-coded image data stored in the first area and the coded image data stored in the second area in accordance with a data amount of the coded image data stored in the second area.

18. A method of storing image data according to claim 17, wherein
in step (d) there is provided control such that when the data amount of the coded image data stored in the second area exceeds a predetermined amount, the coded image data stored in the second area is invalidated, and when the data amount of the coded image data stored in the second area is less than the predetermined amount, the non-coded image data stored in the first area is invalidated.

19. A method of storing image data according to claim 17, wherein in step (c) there is provided control such that the non-coded image data is stored starting from a first address of the image memory means toward a second address thereof, and the coded image data is stored starting from the second address of said image memory means toward the first address thereof.

20. A method of storing image data according to claim 10, wherein when the coded image data is input in step (a), the non-coded image data is generated in step (b) by means of encoding the input coded image data.

21. A method of storing image data according to claim 17, further comprising the step of:
(e) providing control such that in step (d), when the non-coded image data stored in the first area is invalidated, non-coded image data involved in a successive page of image data is overwritten onto the first area, and coded image data involved in the successive page of image data is stored in the remaining area of the second area, while, when the coded image data stored in the second area is invalidated, coded image data involved in the successive page of image data is overwritten onto the second area, and non-coded image data involved in the successive page of image data is stored in a third area of the image memory.

* * * * *

UNITED STATES PATENT AND TRADEMARK OFFICE
CERTIFICATE OF CORRECTION

PATENT NO. : 5,369,505

DATED : November 29, 1994

INVENTORS : ASAO WATANABE ET AL.

It is certified that error appears in the above-identified patent and that said Letters Patent is hereby corrected as shown below:

ON TITLE PAGE

AT [19] UNITED STATES PATENT

"Wantanabe et al." should read --Watanabe et al.--.

AT [75] INVENTORS

"Asao Wantanabe" should read --Asao Watanabe--.

COLUMN 1

Line 20, "include," should read --include--.
Line 21, "the" should be deleted.
Line 23, "Patent" should read --Patents--.
Line 28, "the" should be deleted; and "prior" should read --the prior--.
Line 33, "the" should be deleted; and "only" should read --only:--.

COLUMN 2

Line 15, "a" should read --an--.

UNITED STATES PATENT AND TRADEMARK OFFICE
CERTIFICATE OF CORRECTION

PATENT NO. : 5,369,505

DATED : November 29, 1994

INVENTORS : ASAO WATANABE ET AL.

It is certified that error appears in the above-identified patent and that said Letters Patent is hereby corrected as shown below:

COLUMN 4

Line 30, "is" should be deleted.
    Line 31, "determined" should read --is determined--.
    Line 54, "address-to" should read --address to--.

COLUMN 6

Line 30, "In" should read --An--.
    Line 42, "Second" should read --second--.
    Line 46, "area." should read --area, independent of a data amount of the non-coded image data stored in the first area of said image memory means.--.

COLUMN 7

Line 39, "area." should read --area, independent of a data amount of the non-coded image data stored in the first area of said image memory means.--.
    Line 40, "In" should read --An--.

UNITED STATES PATENT AND TRADEMARK OFFICE
CERTIFICATE OF CORRECTION

PATENT NO. : 5,369,505

DATED : November 29, 1994

INVENTORS : ASAO WATANABE ET AL.

Page 3 of 3

It is certified that error appears in the above-identified patent and that said Letters Patent is hereby corrected as shown below:

COLUMN 8

Line 26, "area." should read --area, independent of a data amount of the non-coded image data stored in the first area of said image memory means.--.
Line 45, "claim 10," should read --claim 17,--.
Line 47, "encoding" should read --decoding--.

Signed and Sealed this

Twentieth Day of June, 1995

Attest:

BRUCE LEHMAN

Attesting Officer

Commissioner of Patents and Trademarks